United States Patent
Patel et al.

(10) Patent No.: US 10,769,223 B1
(45) Date of Patent: Sep. 8, 2020

(54) SYSTEMS AND METHODS FOR IDENTIFICATION AND CLASSIFICATION OF SOCIAL MEDIA

(71) Applicant: State Farm Mutual Automobile Insurance Company, Bloomington, IL (US)

(72) Inventors: Sumit Patel, Altamont, IL (US); Dajun Xu, Urbana, IL (US); Albert Man, Champaign, IL (US); Bradley A. Sliz, Normal, IL (US); Gary Foreman, Urbana, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 101 days.

(21) Appl. No.: 15/596,141

(22) Filed: May 16, 2017

(51) Int. Cl.
| | |
|---|---|
| *G06F 16/9535* | (2019.01) |
| *G06N 3/08* | (2006.01) |
| *G06F 16/35* | (2019.01) |
| *G06F 16/583* | (2019.01) |
| *G06Q 50/00* | (2012.01) |
| *G06K 9/62* | (2006.01) |
| *G06K 9/00* | (2006.01) |
| *G06F 16/28* | (2019.01) |

(52) U.S. Cl.
CPC ........ *G06F 16/9535* (2019.01); *G06F 16/285* (2019.01); *G06F 16/353* (2019.01); *G06F 16/583* (2019.01); *G06K 9/00624* (2013.01); *G06K 9/62* (2013.01); *G06N 3/08* (2013.01); *G06Q 50/01* (2013.01)

(58) Field of Classification Search
CPC .............. G06Q 30/0631; G06Q 50/01; G06F 17/30705; G06K 9/00624; G06K 9/62
See application file for complete search history.

(56) References Cited

U.S. PATENT DOCUMENTS

| | | | |
|---|---|---|---|
| 2015/0348166 A1* | 12/2015 | Trivedi | G06Q 30/0631 705/26.7 |
| 2016/0378760 A1* | 12/2016 | Braz | G06Q 50/01 707/728 |
| 2018/0097762 A1* | 4/2018 | Garcia | H04L 51/20 |

OTHER PUBLICATIONS

J. Li, A. Ritter, C. Cardie, and E. Hovy. Major Life Event Extraction from Twitter based on Congratulations/Condolences Speech Acts. 2014, 11 pp.

(Continued)

*Primary Examiner* — Charles E Lu
(74) *Attorney, Agent, or Firm* — Marshall, Gerstein & Borun LLP; Randall G. Rueth

(57) ABSTRACT

Systems and methods are described for the identification and classification of a social media posting. In various aspects, image-based data and text-based data may be collected from one or more social media data sources associated with a social media posting. Event related data may then be extracted from each of the image-based data and the text-based data, in which the event related data is indicative of one or more life events associated with a social media user who posted the social media posting. One or more life event classifications may be determined from the event related data and an activity, such as sending a message or article to the social media user, may be triggered as a result.

15 Claims, 8 Drawing Sheets

(56) References Cited

OTHER PUBLICATIONS

A. Krizhevsky, I. Sutskever, and G. Hinton. ImageNet Classification with Deep Convolutional Neural Networks. 2012, 9 pp.
G. Wang, D. Hoiem, and D. Forsyth. Building Text Features for Object Image Classification. 2009, 8 pp.

* cited by examiner

400

450

SYSTEMS AND METHODS FOR IDENTIFICATION AND CLASSIFICATION OF SOCIAL MEDIA

FIELD OF THE DISCLOSURE

The present disclosure generally relates identification and classification of social media postings.

BACKGROUND

Millions of online users regularly post data and text to social media platforms, such as Twitter and Facebook, regarding a multitude of related and unrelated topics that include announcements, interests, hobbies, expressions, and many others. This proliferation of social media postings, and the variance and differences among the users' posting styles, languages, vernacular used by the millions of social media users creates a vast body of user-supplied social media data.

A problem arises for parties interested in connecting with or communicating with the social media users regarding specific categories of interest because of the large quantity of disparate data types and the differences in the data based on the multitude of posting styles, languages, and other personal conventions used by social media users. Conventional analytical and computational techniques are limited and fail to offer sufficient identification of such users.

BRIEF SUMMARY

For the forgoing reasons, a need exists for systems and methods that analyze social media user-supplied data and accurately identify social media user topics and interests based upon user postings and related activities. Such an identification can be used to classify users as having recently experienced a major life event, e.g., getting married, buying a new car or house, childbirth, graduation, and other events. The classification may be used, for example, by businesses for finding marketing prospects among the social media users. The classification may also be used for public and customer relations, as social media has become an important outlet for maintaining brand image.

In various aspects systems and methods are described for the identification and classification of a social media posting. In various aspects, image-based data and text-based data may be collected from one or more social media data sources associated with a social media posting. Event related data may then be extracted from each of the image-based data and the text-based data, in which the event related data is indicative of one or more life events associated with a social media user who posted the social media posting. One or more life event classifications may be determined from the event related data and an activity may be triggered as a result. For example, the triggered activity may include sending a communication, including a message or an article, regarding the one or more life events to the social media user. The life events may include any of getting married, buying a new car, buying a new house, childbirth, graduation, or winning a gaming event.

In various aspects, the text-based data may include any of message data, hashtag data, name data, signature data, comment data, emoticon data, reaction data, statistical data, or metadata, each as further described below. The text-based data may also include data from a user profile associated with the social media user.

In another aspect, the determination of the one or more life event classifications based upon the event related data may include inputting the event related data into a predictive model trained, by a machine learning process, to associate the event related data with the one or more life event classifications. The predictive model may be a neural network predictive model.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1:
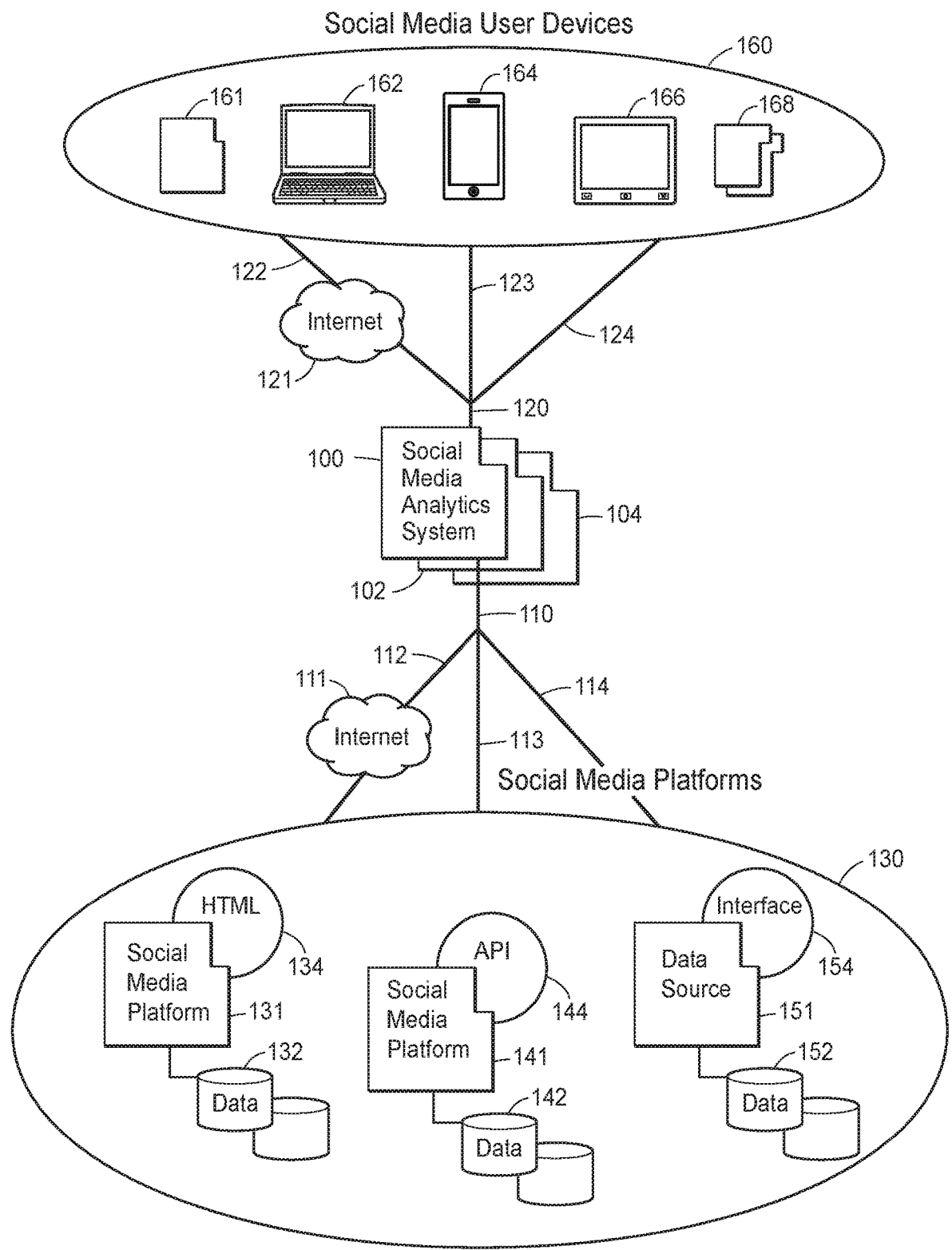
FIG. 1 illustrates a networked system overview of various systems and devices, including a social media analytics system, in accordance with an aspect of the present disclosure.
Figure 2:
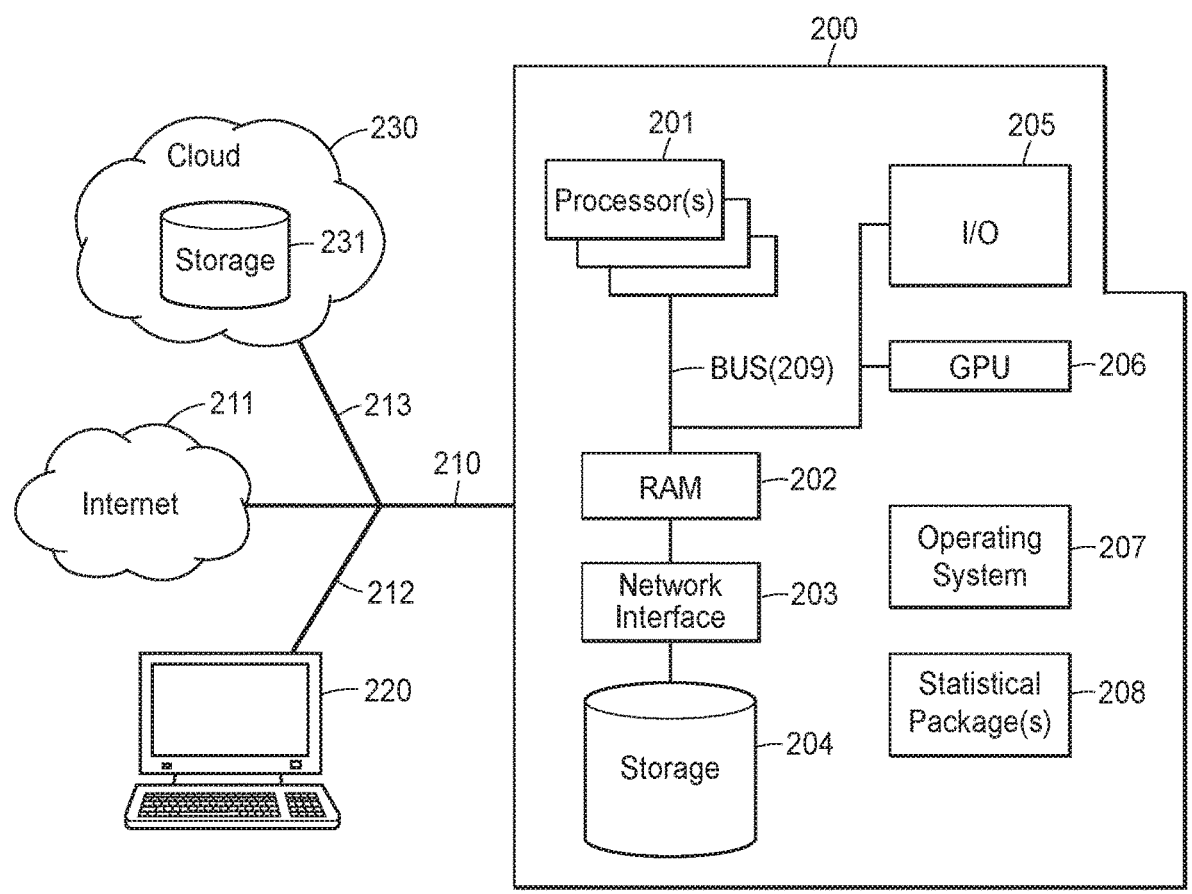
FIG. 2 illustrates an embodiment of a social media analytics system of FIG. 1.

FIG. 1 illustrates an embodiment of a networked system 100 of various systems and devices, including a social media analytics system 100, in accordance with an exemplary aspect of the present disclosure. The network system 100 may facilitate the collection of user-supplied social media data for social media analytics and identification and classification of user life events. The networked system may also facilitate the communication of messages, including, for example, marketing messages, advertisements, and the posting of public and customer relationship messages and articles, to the social media users based upon the user's respective classifications. As is described in greater detail with respect to FIG. 2, FIG. 1 shows a social media analytics system 100, which is a computing device that includes one or more processors. The social media analytics system 100 may be, or, alternatively, may include, one or more computer servers capable of sending and receiving computer messages, such as internet protocol (IP) data messages across a computer network. As depicted, one or more such systems 100-104 may be used in the network system 100 depending on, for example, the demand on each social media analytics system's resources. An increase in demand would result in the use of a greater number of social media analytics systems 100-104 as to share the workload among the systems and therefore scale up to the level of demand needed. The workload or demand placed on any given social media analytics system may include the collection of social media data from various social media platforms or the triggering of notifications and messages to social media users, as further discussed below.

The social media analytics systems may be connected to a computer network 110, for example the Internet 111, over various computer networking channels 112-114, for example Ethernet cables, telephone lines, cable lines, fiber optics, wireless communications, such as WiFi and mobile or cellular channels, and the like.

The social media analytics systems may communicate with, or receive data from, one or more social media platforms 130. Such social media platforms can include any commercial social media platform such as Twitter, Facebook, LinkedIn, or any other social media platform where users share postings, data or updates that include various user interests, topics, hobbies, news, expressions, or other related data. Each of the social media platforms can comprise any number of computers, servers, networking equipment, databases, data storage, operating systems, programs, application programming interfaces (API), or any other hardware or software used to implement the social media platform and allow social media users create and view social media postings. For example, social media platform 131 may consist of one or more computer servers that receives social media postings from users and displays those postings in online webpages. The data that makes up a social media posting, including, for example, image data, text data, the poster's name, emoticons, user reactions, comments, shares, likes, metadata, or any other related data, may be stored in one or more databases 132. The one or more databases 132 may be local or remote databases, such as cloud-based databases, used by the social media platform 131. The social media platform 131 may display the social media postings, and related content, in Hyper Text Markup Language (HTML) 134 in the one or more webpages that may be available to one or more other users.

In one aspect, the social media analytics system 100 may collect the social media data from social media platform 131 by scraping the data from the HTML webpages 134 displayed by social media platform 131. Scraping the data includes retrieving the HTML information from social media platform 131 and then extracting the posting information from the social media posting, such that certain information such as the image data and text data, and other related posting information, is kept and other non-posting information, for example, the HTML code used to create the borders or bottom of the webpage is discarded.

In one aspect, the social media analytics system 100 may collect the social media data from social media platform 141 through an API 144 provided by a social media platform 141. The API can provide a framework of specific software functions or calls that can be utilized by software developers to retrieve data or otherwise interact with the social media platform 141. For example, social media posting data can be requested by the social media analytics system 100 from the social media platform 141 via a function to API 144. API 144, as part of the social media platform 141, may then collect the social media data from the database(s) 142 associated with the social media platform 141, which can be local or remote databases. The API may then return the social media data to the requesting social media analytics system over the networked computer networking channel 113.

In other aspects, the social media platform need not be associated with a platform responsible for posting users' social media postings. Instead, a social media platform may include, or be, a data source that stores social media data or information regarding user posts, interests, topics, hobbies, news, expressions, or other related data. For example, this may include a data source 151 used by one or more social media platforms to store, backup or otherwise hold the user information. This may include cloud-based hosted information, such as hosting at a remote computer server(s). Similar to the social media platforms 131 and 141, the data source platform 151 could be accessible via an interface 154, which could be an API or HTML, where a social media analytics system 100 would be able to collect user information from the data source 151, such information stored, for example, in the data source's 151 related database(s) 152.

As will be described further below, the social media analytics system 100 may use the social media data collected from one or more of the social media platforms to classify one or more social media data postings into a related event based on data analytics. Based upon the classification and/or data analytics, the social media analytics system 100 may trigger an activity that may include sending a notification, advertisement, posting, or other communication to a social media user who posted a specific posting or posting(s). The trigger activity may also include posting a general advertisement that many users would be able to view, where, for example, numerous types of the same classifications of postings have been detected, for example, numerous postings related to childbirth. The trigger activity may also include sending or positing articles, or other information, regarding the classification. For example, an article titled "5 Steps to Swaddling a Baby," may be posted or sent to social media users who recently have been identified as experiencing a childbirth life event. Such articles may be sent by a business for political and customer relations purposes.

In one aspect, the social media analytics system 100 of FIG. 1, based upon the trigger activity, may send a related notification, post an advertisement, article, or other information as describe above, to one or more social media user devices 160. Such information may be sent using computer network 120, for example, the Internet 121, over one or more computer networking channels 122-124. The channels can be the same channels as those for computer networking channels 112-114, as described above. The user devices 160 may include any of a personal computer 161, laptop 162, mobile device 163, such as a mobile or cellular phone, a tablet device 166, or any other computing device 168, that include one or more processors. The users may receive the notifications, advertisements, articles, or other information sent by the social media analytics system 100 for display on the computing devices.

FIG. 2 illustrates an embodiment of a social media analytics system 100 of FIG. 1. In one aspect a social media analytics system includes one or more processors 201, memory 202, for example Random Access Memory (RAM), and one or more storage devices 204 for storing, analyzing or otherwise computing the social media data as described herein. The social media analytics system may further include a network interface 203, such as an Ethernet networking card or equipment, WiFi networking card or equipment, or other similar networking interface equipment for communicating on a computer network 210, for example the Internet 211, or other computer networking channels, including those described above for FIG. 1, for example, computer networking channels 112-114. For example, the social media analytics system 200 may communicate over network 210 via computing channel 212 with social media client devices 220, which may include any of the one or more social media user devices 160 describe for FIG. 1. The social media analytics system 200 may also communicate with any internet or cloud-based data storage systems 230 via computing channel 213, for example any of the social media platforms 130 as describe for FIG. 1.

The storage system 230 may include any number of storage devices 231, for example, databases or data repositories, storing, for example, the collected social media data as described above for FIG. 1. The social media data used by the social media analytics system 200 may be stored remotely in the storage device 231 and accessed when performing analytics. The social media data may also be stored locally in the social media analytics system 200's storage device 204, which can be any number of databases or data repositories, including relational databases and/or computer files.

The social media analytics system 200 may also include an input/output (I/O) system 205 that includes, for example, a display screen, keyboard, mouse, touchscreen or any other user device allowing a user to interact with the social media analytics system 200. The social media analytics system 200 may also include a Graphical Processing Unit (GPU) that displays the social media data or other screened information or controls to the user of the system 200. A computer bus 209 may connect the processors(s), memory 202, network interface 203, storage device 204, I/O system 205 and GPU 206 and facilitate the flow of data and operation among these components. An operating system 207 may also be associated with the system 200, where the operating system is in communication with and controls the various system 200 components and allows a user, for example, to view, run analytics, or otherwise manage or manipulate the social media data and or other systems, methods or functionality of the social media analytics system as described herein.

The social media analytics system 200 may also be accessed remotely, such as through the Internet and the Network Interface 203, to allow a remote user of the system 200 to perform the same functionality.

Any number of statistical packages or software 208 may be installed on system 200 and may be used in analyzing the social media data as described herein. Examples of statistical packages and software may include the R programming language and related libraries, the Python programming language and related statistical libraries, or any other similar or related statistical packages or software.

Figure 3:
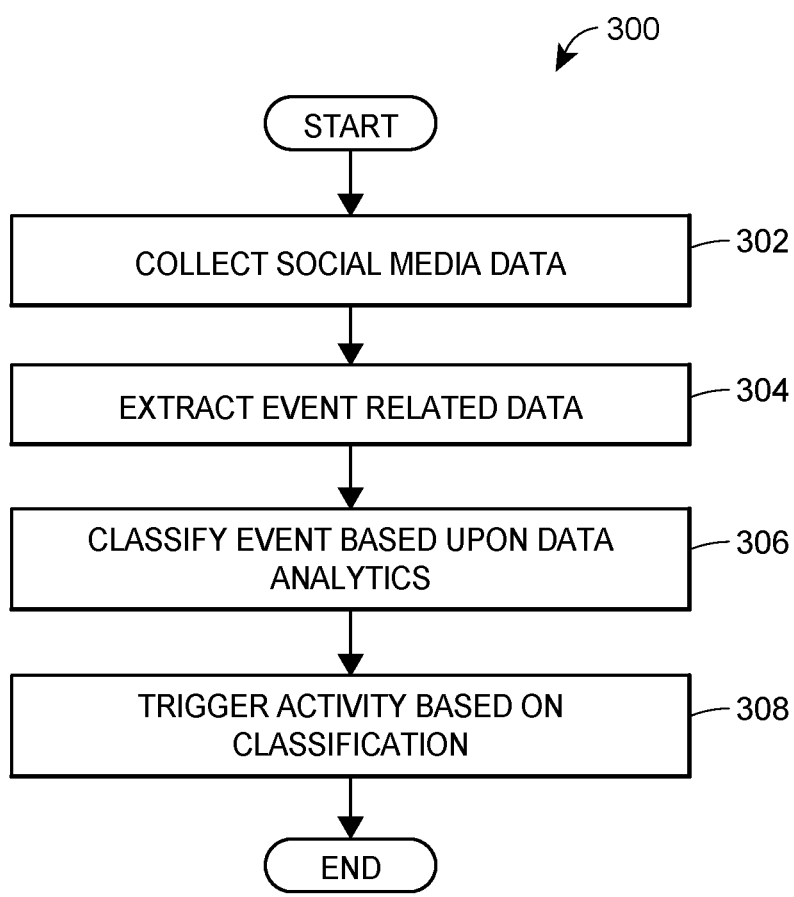
FIG. 3 illustrates a flow diagram of an exemplary social media data collection and analytics method.

FIG. 3 illustrates a flow diagram of an exemplary social media data collection and analysis method 300. The method 300 may be performed by a computing device with one or more processors, including, for example, the social media analytics system 100 described herein. The computing device may collect social media data from one or more social media platforms (block 302), such as the social media platforms 130 as described herein. The collection method may include scraping the data from an HTML page or downloading specific data from an API associated with a social media platform. In another aspect, the social media data may be collected from specific webpages on a particular social media platform. For example, one business may collect data from its own social media platform webpage or from the social media platform webpage of its competitors.

The computing device may then extract event related data from the collected data (block 304). The method may include targeting specific portions of a social media posting where event related data typically appears, such as within the body of the social media posting or other areas, as further described herein. Other aspects of a social media posting that may be extracted, or otherwise collected, are the posting's image data, text data, the poster's name, emoticons, user reactions, comments, shares, likes, metadata, or any other related data. Event related data may include data indicative of major user life events such as getting married, buying a new car or house, childbirth, graduation, and other similar events.

The method may extract specific event related data in order to identify social media postings that include relevant terms. For example, the method may extract key terms such as "win," "award," "year," "won," "best," "team," and "game" to identifying a congratulatory social media posting regarding winning a sports game. In same manner, the method may filter or exclude other social media postings that lack such terms.

In the method 300, the computing device performs analytics on the extracted social media event related data to classify the social media posting into one or more of life events (block 306). The classification may be based upon an identification, from the analysis of the data, that the social media posting relates to one or more life events. The analysis may include applying one or more machine learning techniques or analyses, or models, such as an artificial neural network machine learning model 900 of FIG. 9, to the extracted event data. For example, in one aspect, a predictive model may be trained using machine learning to identify life event classifications using past social media postings and related data.

Figure 9:
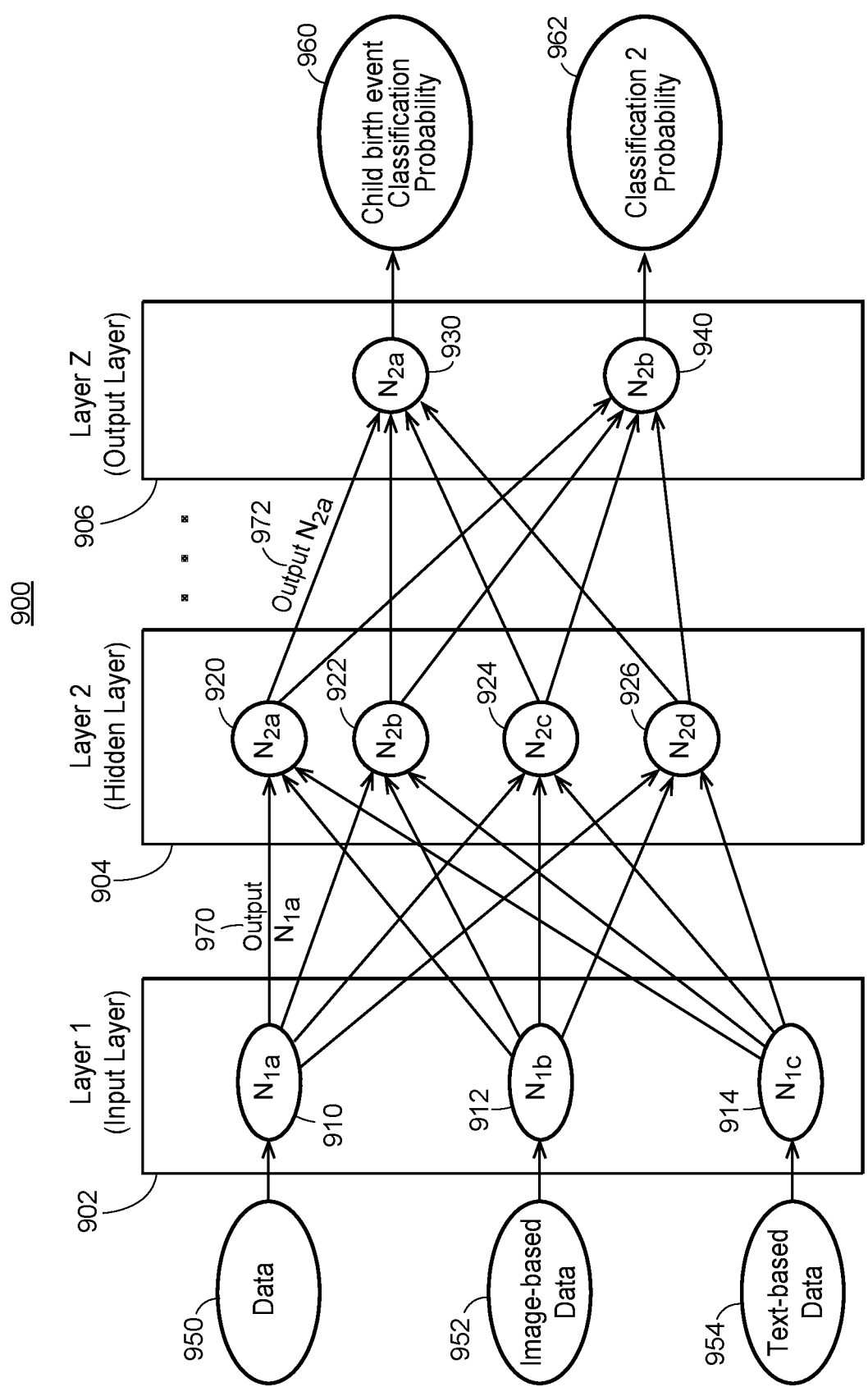
FIG. 9 shows an example neural network predictive model in accordance with embodiments described herein.

In one aspect, a neural networking model, for example, as describe for FIG. 9, is created or trained by assigning and/or reducing the error of different computational weights to the topics, text, images, words, and other data of a social media posting used to classify life events. Weights could be associated with several nodes and layers, where the nodes are arranged into several layers forming a neural net. Communication among the nodes and layers would take place by inputting weights from lower layer level nodes to higher level layer nodes, thereby determining a final weight or score that is ultimately used to identify and classify the life events. For example, posts having a weight or score above a certain threshold value would be associated with certain life events, and posts below the threshold would not. In this way, life events become associated, and therefore can be classified, with certain types or mixes of social media data, including topics, text, images, words, and other data.

The predictive model may be trained via a computer implemented method that associates the social media posting data with life events based upon key data or example data. In another aspect, an interactive method is used, where a user utilizes machine learning software to associate specific life events with specific relevant postings, for example the life event "childbirth" may be associated with a posting that the user titled "It's a boy!" The machine learning software could then input this association, and possible numerous other associations from the user or other users, and build a predictive model trained with "childbirth" related data. In some aspects, users would be able to vote for which social media postings applied to which life event categories, where the voting data would be further applied to the machine learning software to train the predictive model to make it more accurate in identifying and classifying life events.

In other aspects, other analytic techniques may also be used instead of machine learning to build a predictive model, such techniques including regression analysis, correlations, associations, or any other computational method of classifying the social media postings and/or data with respective life events.

Based upon the classification and/or analytics of block 306, the computing device may trigger an activity, including the communication of messages, postings, or other communications to social media users, such as, for example, marketing messages, advertisements, public and consumer relationship messages and articles and the like as described herein (block 308). For example, if a social media posting is classified as a childbirth life event in 306, then an activity such as posting an advertisement for baby formula to the user's social media page may be triggered. Other triggered activities may include sending a related email to the user, or posting or otherwise sending an article regarding a topic that the user may be interested in, such as "5 Steps to Swaddling a Baby."

Figure 4A:
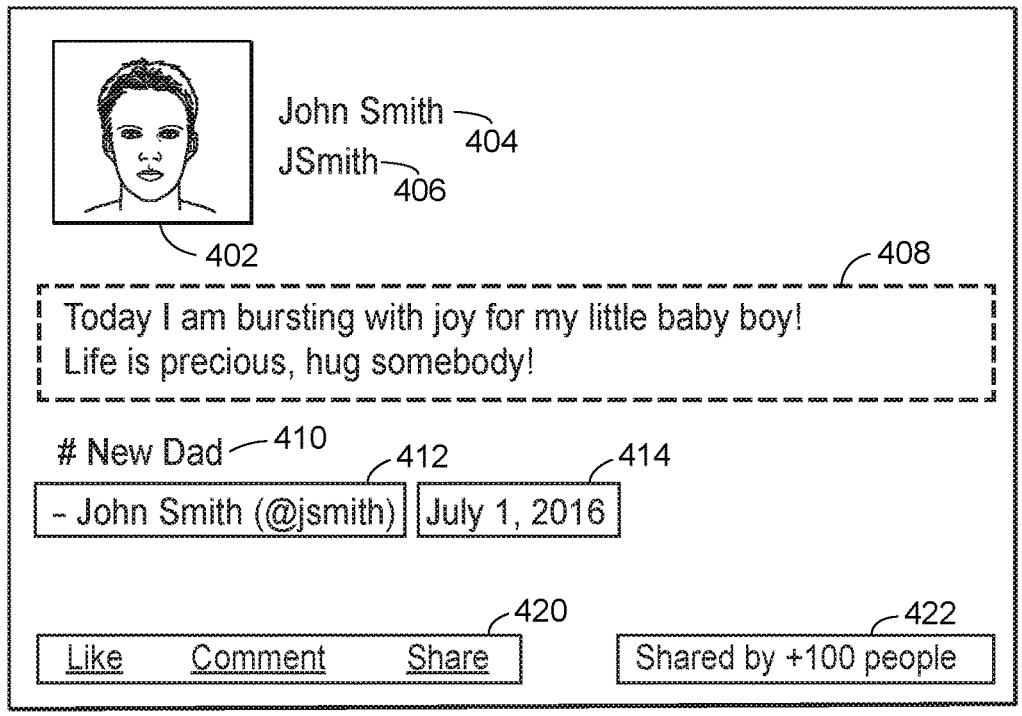
FIG. 4A illustrates an example of a text-based social media posting.

FIG. 4A illustrates an example of text-based social media posting 400. The social media posting 400, and other social media postings described herein, may be displayed by any number of computing devices, such as a personal computer or mobile phone, or any of the social media user devices 160 as depicted and described for FIG. 1. The data associated with the social media posting 400 may be stored in a database, storage device, server or remote server, or cloud-based storage in accordance with the disclosures herein. The text-based social media posting 400 may include certain data in related sections of the posting, including a graphic associated with the user 402 and a name that identifies the user 404, such as "John Smith." The name 404 can be the user's legal name or a surrogate name used by the user on the social media platform. Data, in the form of a short name 406, may also be associated with the posting 400.

The social media posting 400 also includes text-based data 408, for example, data in the form of message, notification or communication from the user making the post. The text data 408 may include any number of related data, such as a hashtag 410 associated with the message. The message may also include an electronic signature 412 that identifies the user and that may include the address of the user, e.g., "@jsmith" on the social media platform. The social media posting 400 may also include the date of the posting 414.

The social media posting 400 may also include links, buttons or other controls 420 where other social media users may react or otherwise interact with the social media posting 400. For example, as shown, other users may indicate that they "Like" the posting 400.

Other users may also provide their own respective comments or share the posting 400. Commenting on the posting associates the comments with the particular posting 400, for example, by displaying the comments underneath the posting 400 (not shown). The social media posting 400 may also include other data or information, for example, how many times the particular posting was shared by other users 422. Other data, such as metadata (not shown), may also be associated with the posting 400, but is otherwise not shown or displayed to the user or other users. Such information may include the user's email address, unique id, number of posts, date of sign up to the social media platform, when the social media platform is typically used by the user, or statistical data associated with the user, or other such information or data.

Figure 4B:
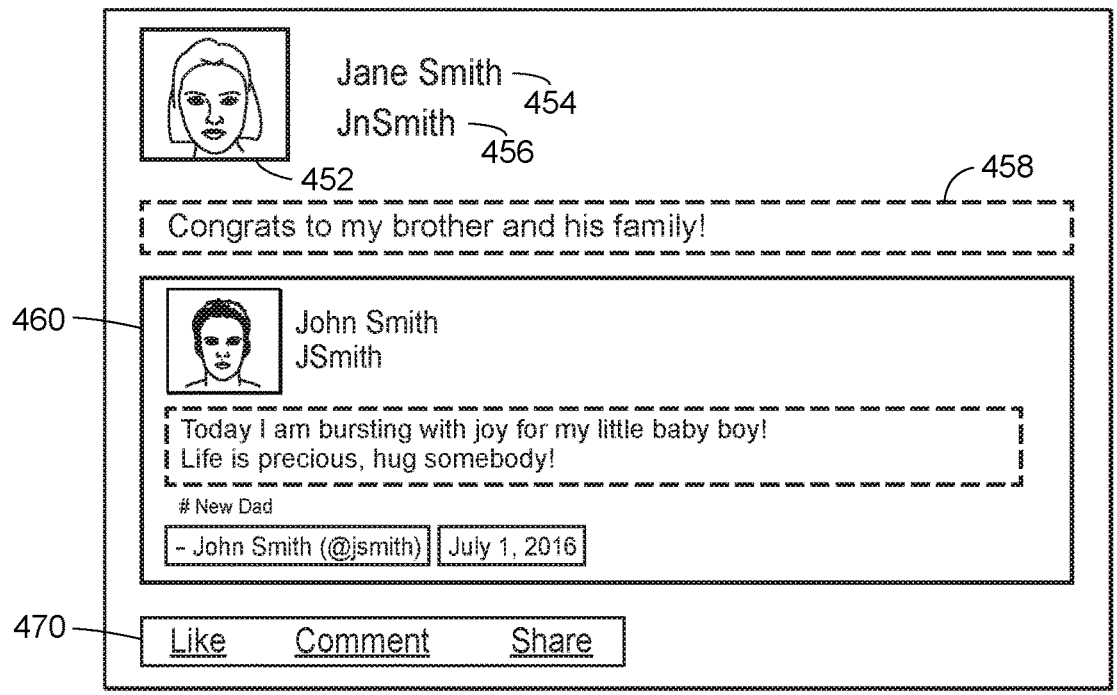
FIG. 4B illustrates an example of a shared version of the social media posting of FIG. 4A.

FIG. 4B illustrates an example of a shared version of the social media posting of FIG. 4A. The shared social media posting 450 represents a posting that a second user shares after review the posting posted by a first user, such as the posting 400. The shared social media posting 450 may include certain data in related sections of the posting that are similar to posting 400, including a graphic associated with the second user 452 and a name that identifies the second user 454, such as "Jane Smith." The name 454 can be the second user's legal name or a surrogate name used by the second user on the social media platform. Data, in the form of a short name 456, may also be associated with the shared posting 452. The shared posting may include a text-based message 458 from the second user, typically relating to the posting and a listing of links, buttons or other controls 470 that other users can use to react or otherwise interact with the shared posting 450, in the same manner as described for the original posting 400. In addition, the shared posting 450 may include a copied or paraphrased version 460 of the original posting 400 that other users can review to identify the original context and data of the shared posting.

Although FIGS. 4A and 4B show specific examples of social media postings and related data, the aspects of the invention are not limited to these examples. Any social media posting or data that can be used in accordance with aspects of the invention as describe herein are also applicable.

Figure 5A:
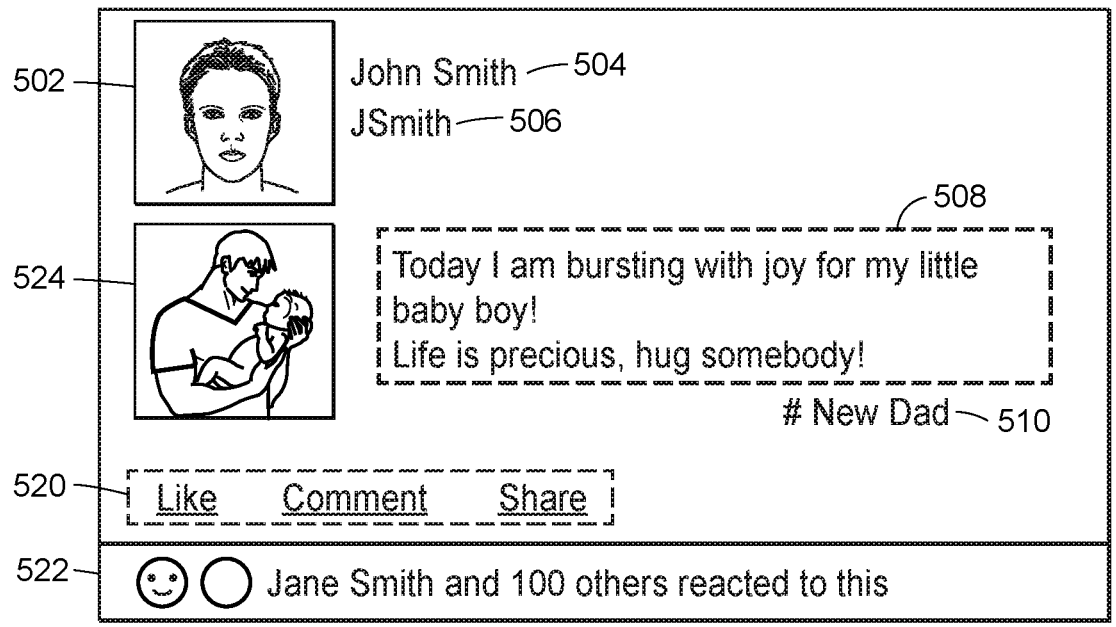
FIG. 5A illustrates an example of an image-based and a text-based social media posting.

FIG. 5A illustrates an example of an image-based and a text-based social media posting 500. The social media posting 500, and other social media postings described herein, may be displayed by any of a number of computing devices, such as a personal computer or mobile phone, including any of the social media user devices 160 as depicted and described for FIG. 1. The data associated with the social media posting 500 may be stored in a database, storage device, server or remote server, or cloud-based storage in accordance with the disclosures herein. The text-based social media posting 500 may include certain data in related sections of the posting, including a graphic associated with the user 502 and a name that identifies the user 504, such as "John Smith." The name 504 can be the user's legal name or a surrogate name used by the user on the social media platform. Data, in the form of a short name 506, may also be associated with the posting 500.

The social media posting 500 may also include image-based data 524, for example, a picture, drawing, graphic, or other image posted by the user. The image data 524 may be formatted in any computer image file type, including, for example, the image file formats JPEG, TIF, GIF, BMP, PNG, and the like. Social media users may post image data 524 related to life events, including the various life events as described herein. For example, a user may post a picture 524 of the user holding his newborn baby boy which could relate to the childbirth life event.

The social media posting 500 also includes text-based data 508, for example, in the form of message, notification or communication from the user making the post. The text data 508 may include any number of related data, such as a hashtag 510 associated with the message. The message may also include an electronic signature (not shown) that identifies the user and that may include the address of the user, e.g., "@jsmith" on the social media platform. The social media posting 500 may also include the date of the posting (not shown).

The social media posting 500 may also include links, buttons or other controls 520 where other social media users may react or otherwise interact with the social media posting 500. For example, as shown, other users may indicate that they "Like" the posting 500. Other users may also provide their own respective comments or share the posting 500 with other users. Commenting on the posting associates the comments with the particular posting 450, for example, by displaying the comments underneath the posting 500, as further described with regarding to FIG. 5B herein. The social media posting 500 may also include reaction or interaction data 522 regarding what or how other users reacted to or interacted to the post. For example, the reaction or interaction data 522 may show the number of users that reacted to the posting 500. As another example, the reaction or interaction may show a listing of emoticons, such as smiling faces, hearts, and the like, that users associated with the posting 500.

Other data, such as metadata (not shown), may also be associated with the posting 500, but is not shown to the user or other users. Such information may include the user's email address, unique id, number of posts, date of sign up to the social media platform, when the social media platform is typically used by the user, or other statistical data associated with the user, or other such information or data.

Figure 5B:
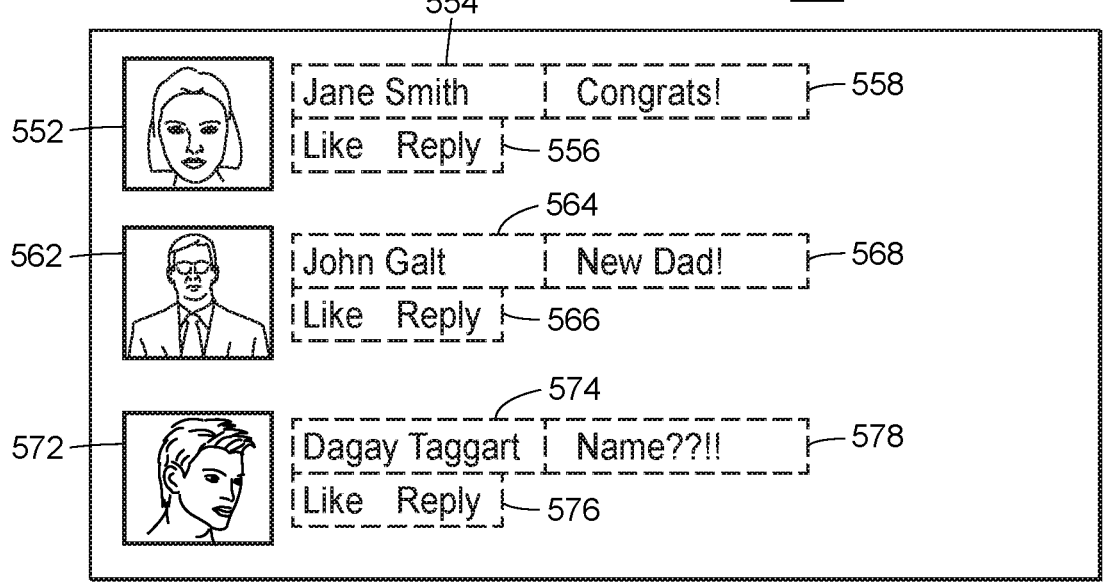
FIG. 5B illustrates an example of social media comments posted for the social media posting of FIG. 5A.

FIG. 5B illustrates an example of social media comments 550 posted for the social media positing of FIG. 5A. The comments 550 may be displayed underneath, next to, juxtaposed, or in any other format or arrangement suitable to associate the comments 550 with the posting 500. The comments 550 may also be displayed separately, such as in a separate section or portion of the display, or on another display or web page. The data related to the comments 550 may also be stored together with the posting 500, or separately in a different table of a database or in a different database or storage device. The comments 550 may comprise one or more comments posted by other users reacting or interacting with a user posting, for example, posting 500. The other users may initiate a request to post a comment by selecting the "Comment" link from the controls 520 listed with posting 500.

A comment may comprise a graphic 552 associated with the user posting the comment. The comment may also include a name that identifies the user 554, such as "John Smith." The name 554 can be the user's legal name or a surrogate name used by the user on the social media platform. The comment may also include links, buttons, or other controls 556 where other social media users may react or otherwise interact with the comment. The comment may also include text-based data 558, for example, in the form of message, notification or communication from the user posting the comment. The comment may include any number of related data, such as a hashtag associated with the text data (not shown). The text data may also include an electronic signature (not shown) that identifies the user posting the comment and that may include the address of the user, e.g., "@jsmith" on the social media platform. The comment may also include the date the comment was posted (not shown). Other data, such as metadata (not shown), may also be associated with the comments 550, but is not shown to the user or other users. Such information may include the comment poster's email address, unique id, number of posts, date of sign up to the social media platform, when the social media platform is typically used by the comment poster, or other statistical data associated with the comment poster, or other such information or data.

As shown, one or more comments may be posted by different user, where each comment can include, for example, the poster's graphic 552, 562, 572, user name 554, 564, 574, text data 558, 568, 578, controls 556, 566, 576 and other such information as described above.

Although FIGS. 5A and 5B show specific examples of social media postings and related data, the aspects of the invention are not limited to these examples. Any social media posting or data that can be used in accordance with aspects of the invention as describe herein are also applicable. For example, any of the postings, or related data of those postings, and from any of FIGS. 4A, 4B, 5A, and/or 5B or combinations thereof, may be used in any of the aspects described herein.

Figure 6:
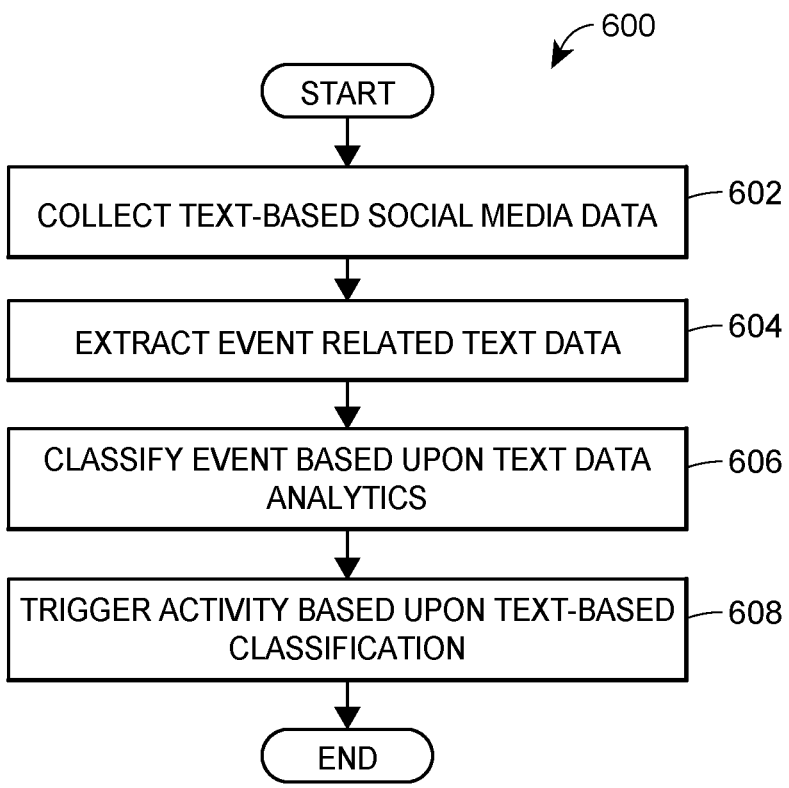
FIG. 6 illustrates a flow diagram of an exemplary social media data collection and analytics method for a text-based social media posting.

FIG. 6 illustrates a flow diagram of an exemplary social media data collection and analysis method for a text-based social media posting. The method of FIG. 6 may include any of the functionality or techniques as described for method 300 of FIG. 3, and, therefore, the related FIG. 3 disclosure is incorporated in its entirety herein with respect to FIG. 6. The method 600 may be performed by a computing device with one or more processors, including, for example, the social media analytics system 100 described herein.

The computing device may collect social media data from one or more social media platforms, such as the social media platforms 130 as described herein (block 602). For example, the social media data associated with the postings 400 and 450 of FIGS. 4A and 4B, respectively, may be collected. Such data may include the graphic data, name data, text-based data, share data, and other data, as described for FIGS. 4A and 4B. Other data including the number of reactions, comments, and shares of posts may also be collected. As a further example, the number of comments for each status published; or number of shares based upon the hour of the day may also be collected. Social media data may further include user post history, user self-descriptions, and friend networks from multiple social media platforms, and user posts that have gone viral, for example, shared by many users. Such data can be collected by scraping the social media web pages or retrieving the data via an API, each as described herein.

At 604, the computing device may extract event related text-based social media data from the collected data. The method may include targeting specific portions of a social media posting where event related data typically appears, such as within the body of the social media posting or other areas, as further described herein. For example, with respect to FIGS. 4A and 4B, event related text-based data may include extracting data from the text data 408, including key terms such as "today," "joy," "baby," "boy," "life," "precious" and "hug." Such terms may indicate a childbirth life event for the poster of posting 400. Other related event text-based data that may be extracted is the hashtag data 410, in the case of FIG. 4A, the text data "# NewDad," which may further be indicative of a childbirth life event.

In other aspects, shared posts, such as those described for FIG. 4B, would provide additional text-based data further indicative of the life event. In FIG. 4B, for example, event based data could be extracted from the text-based data 458, where the key terms "Congrats" and "Family" would be further indicative of a life event, in which childbirth would be one of several possible classifications. In same manner, the method 600 may filter, ignore or otherwise exclude social media postings that lack any such terms or that lack too few terms below a threshold minimum amount.

The computing device may extract text-based data using any number of computational methods, including natural language toolkits, regular expressions, packages or other software designed for working with text-based data or human language data. Such software identifies and extracts key words, phrases or tokens, from messages, phrases, sentence, or otherwise text-based postings that are typically made by social media users. In one aspect, the keywords or phrases are identified and taught to the computing device, such as the social media analytics system, either by input into the system directly or via training the system by associating life event categories with specific past postings and allowing the computing device to learn which key words, from the postings, are associated with the respective event. Training the system in this way may be performed by machine learning techniques, processes, or other related techniques as described herein. For example, a predictive model may be built or trained by taking posting data, where the model learns which key words or phrases from the posting data are indicative of particular life categories. Such a model is then used to identify and extract key words from future postings.

At 606, the computing device performs analytics on the extracted text-based social media data to classify the social media posting into one or more life events. The analysis may include applying analytic techniques, such as a predictive model determined from a machine learning process, to the extracted event data. For example, such a predictive model may be built by training a machine learning program with extracted text from 604. The predictive model may be trained to recognize and assign weights to the key words, where the key words and weights would be indicative of one or more classifications or categories of life events. For example, and with respect to FIG. 4A, the predictive model could be trained to recognized that text data, including the key word "baby," the key phrase "baby boy," or the hashtag "# NewDad" of posting for FIG. 4A, is highly indicative of the childbirth event.

Other key words in the text data may provide an additional, but lesser, indication to the prediction model of a particular life event, where such words are generally applicable to multiple classifications or categories of life events. For example, the "congrats" or "family" key words from the shared post 450 associated with posting 400 may be generally indicative of childbirth event because such key words could be indicative of a childbirth event, or may, also be indicative of the life event of buying a home. While such general key words may not be strongly indicative of a particular life event, e.g., childbirth, they may nonetheless provide an additional boost to overall indication when considered together with other text based data, or other data, of the post, for example, "baby" or "boy."

In other aspects, terms such as "congrats" or "congratulations" may be determined by the prediction model as critical for identifying life events in the first instance and used as a way to filter life event postings from non-life event postings. In one example, the prediction model may be trained to ignore postings that do not have the "congrats," "congratulations," or similar congratulatory key words in any section of the posting or related posting data sections, such as the comments or other shared postings. In similar aspects, a posting may require a certain number of reaction events, such as a certain number of "likes," shares, or certain number comments, before the posting is considered for classification. Any number of filtering words or prequalifying key words may be used by the prediction model in the analysis of the extracted event data.

Based on the extracted text-based analytics, the predictive model could then assign a probability that a social media posting related to one or more life event classifications. For example, the posting 400 could be assigned a probability for each of the life events, each probability reflecting the likelihood of the posting belonging to any of the life events. Posting 400 may, for example, be assigned a high probability for the childbirth event and a lower probability for the life event for buying a home, based upon the extracted key words in the post 400.

At 608, and based upon the classification and/or analytics of block 606, the computing device may trigger an activity, including the communication of messages and postings to social media users, such as, for example, marketing messages, advertisements, public and consumer relationship messages and articles and the like as described herein. For example, if the social media posting 400, as depicted in FIG. 4A, is classified as a childbirth life event at block 606, then an activity such as posting an advertisement for baby formula to the user's social media page may be triggered. Other triggered activities may include sending an email to the user, or posting or otherwise sending an article regarding a topic that that the user may be interested in, such as "5 Steps to Swaddling a Baby."

Figure 7:
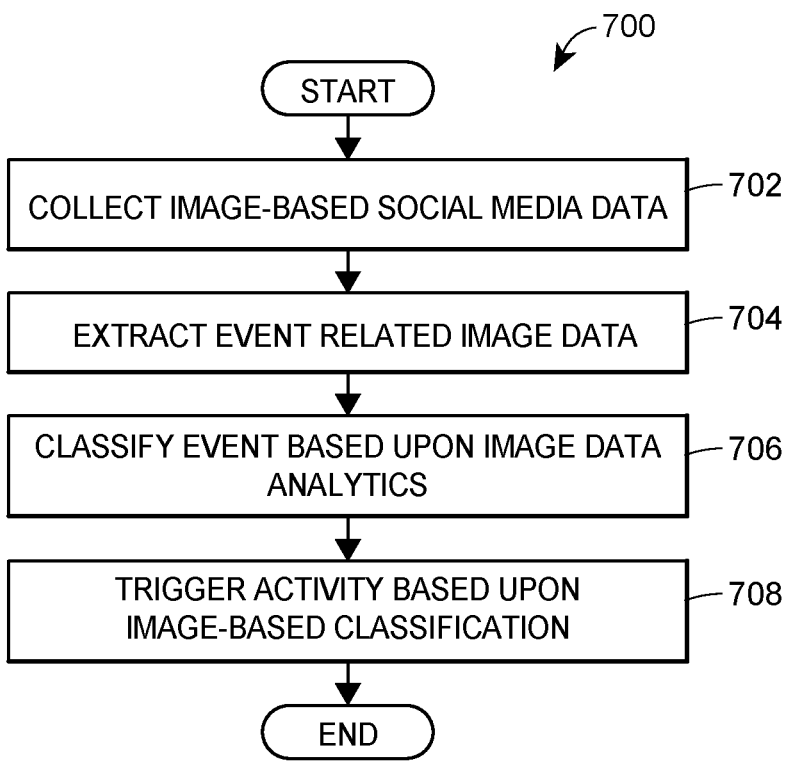
FIG. 7 illustrates a flow diagram of an exemplary social media data collection and analytics method for an image-based social media posting.

FIG. 7 illustrates a flow diagram of an exemplary social media data collection and analysis method for an image-based social media posting. The method of FIG. 7 may include any of the functionality or techniques as described for method 300 of FIG. 3, and, therefore, the related FIG. 3 disclosure is incorporated in its entirety herein with respect to FIG. 7. The method 700 may performed by a computing device with one or more processors, including, for example, the social media analytics system 100 described herein.

At 702, the computing device may collect social media data from one or more social media platforms, such as the social media platforms 130 as described herein. For example, the social media data associated with the postings 500 and 550 of FIGS. 5A and 5B, respectively, may be collected. Such data may include the graphic data, name data, image-based data, text-based data, share data, and other data, as described for FIGS. 5A and 5B. Other data including the number of reactions, comments, and shares of posts, emoticons posted may also be collected. As a further example, the number of comments for each status published; or number of shares based upon the hour of the day may also be collected. Social media data may further include user post history, user self-descriptions, and friend networks from multiple social media platforms, and user posts that have gone viral, for example, shared by many users. Such data can be collected by scraping the social media web pages or retrieving the data via an API, each as described herein.

At 704, the computing device may extract event related image-based social media data from the collected data. The method may include targeting specific portions of a social media posting where event related data typically appears, such as within the body of the social media posting or other areas, as further described herein. For example, with respect to FIGS. 5A and 5B, event related image-based data may include extracting data from the image data 524. For image data, extraction techniques, for example machine learning techniques, may be used that include inputting the posted image into a predictive model trained to recognize key features of the image, including common features typically associated with a type of image.

For example, key features associated with images containing human faces includes two eyes in the proper location with respect to a nose and a mouth because such features are typical to human faces. The eyes, for example, may be identified by a predictive model from an identification of white computer pixels, arranged in an approximate circular or oval shape in the image, and including a dark or colored portion, the pupils, in the center of the circle or oval. Such identification could be assigned a certain weight by the predictive model, where the greater the weight, the more probable the identification is to a particular feature, for example, eyes. In another aspect, darkened linear pixels above those shapes, indicative of eyebrows, may further indicate the presence of eyes in the image, where such an indication would be further assigned additional weights by the predictive model. The nose and mouth may next be identified, for example, by taking the position of the eyes and applying known common or typical distances, for human faces, from the eyes identified in the image to determine whether a darkened horizontal line of pixels, the mouth, and/or a darkened vertical line of pixels, the nose, appear at the appropriate positions relative to the identified eyes. Further weights could be assigned for such the identification of the nose and mouth, and, thus, a greater probability could be calculated ended added for the image that it includes a human face.

For example, in a neural network machine learning modeling process, each of the eyes, nose, and mouth could be assigned to different nodes within the neural net, and at different layers, where the identification, e.g., related to eyes, in one layer of nodes of the neural net would assign weights to those nodes. The nodes of that layer would then be used to inform the next layer of nodes, e.g., related to nose, that may make a further identification, e.g., related to mouth, and assign more weights, thus, increasing the overall probability of the identification of a human face in a given image.

For example, image data related to the eyes, noses and mouths of the man and the baby of image 524 of FIG. 5 can be extracted, where the smaller distances between the eyes, nose, and mouth of the baby compared with that of the man, may indicate a childbirth event, where the predictive model associates images that include one-set of smaller distanced eyes and one set of larger distanced eyes with childbirth life events.

Thus, such images could be input into predictive model, such as describe for FIG. 9, which could be the trained neural network based model as describe above, for identification and extraction of the key features. In one aspect, the prediction model may be pretrained directly by a user identifying the portions of the image or pixels that make up the eyes, nose or mouth features. For each successful identification, a weight indicating a probability that the image includes a human face could be assigned. The more weights, for example, a sum of the weights, then the greater the indication that the image includes the particular features, e.g., a human face.

In another aspect, the prediction model may be trained by associating the numerous examples of images with client events. For example, numerous images showing newborn children could be assigned with the childbirth life event. In this way, a prediction model could learn, via machine learning, the key features, pixels or other aspects of the image that are typical of such images.

In another aspect, both direct training and training by association may be employed together to pretrain and fine-tune the prediction model to learn important features for important event related data. In such a model, the weights from one technique would be used to pre-train the model and fine-tune it for the application of the other technique. In certain embodiments, the model that uses both direct and associated training may experience a greater degree of accuracy, and less of a learning curve loss, for the prediction model than a model that uses only the direct training method or only the associated training method.

At 706, the computing device performs analytics on the extracted image-based social media data to classify the social media posting into one or more life events. The analysis may include applying analytic techniques, such as a predictive model determined from a machine learning process, to the extracted event data. For example, such a predictive model may be built by training a machine learning program with extracted image data from 704. The predictive model could be trained to identify extracted event related image data including two human faces, where the image includes two sets of eyes, nose and mouth. For example, the predictive model could use the extracted data from 704, including the data regarding the eyes, noses and mouths of the man and the baby of image 524, where the identification is based upon the smaller distances between the eyes, nose and mouth of the baby compared with that of the man holding the baby. Such identification may indicate that the extracted image data is associated with a childbirth event, and, thus the related posting 500 would have a high probability of being classified as a childbirth life event.

In other aspects, the image data may include one or more images, where the predictive model be applied to each of the images and assign weights and probabilities of specific life event classifications to each of the images, and then, for the images as a whole.

Thus, based on the extracted image-based analytics, the predictive model could then assign a probability that a social media posting related to a particular life event classification. For example, the posting 500 could be assigned a probability for each of the life event classification categories, each probability reflecting the likelihood of the posting belonging to any of the life event categories. Posting 500 may, for example, be assigned a high probability for the childbirth event and a lower probability for other life events, based upon the extracted image data 524, including the eye, nose and mouth data, associated with the posting.

At 708, and based upon the classification and/or analytics of block 706, the computing device may trigger an activity, including the communication of messages and postings to social media users, such as, for example, marketing messages, advertisements, public, and consumer relationship messages and articles and the like as described herein. For example, if the social media posting 500, as depicted in FIG. 5A, is classified as a childbirth life event in block 706, then an activity such as posting an advertisement for baby formula to the user's social media page may be triggered. Other triggered activities may include sending an email to the user or posting or otherwise sending an article regarding a topic that the user may be interested in, such as "5 Steps to Swaddling a Baby."

Figure 8:
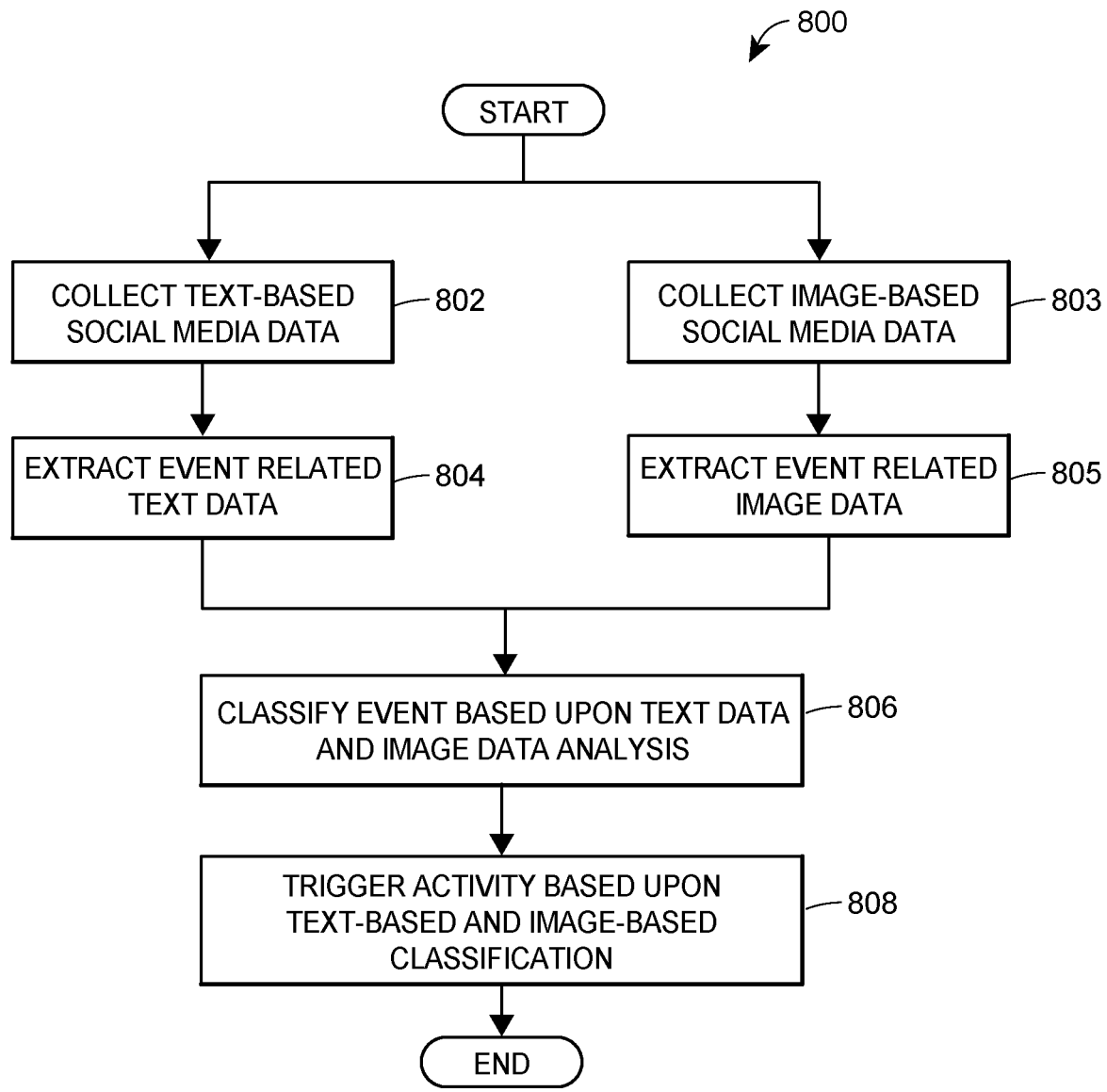
FIG. 8 illustrates a flow diagram of an exemplary social media data collection and analytics method for a text-based and image-based social media posting.

FIG. 8 illustrates a flow diagram of an exemplary social media data collection and analysis method for a text-based and image-based social media posting. Although the analytics involved in the text-based and image-based methods 600 and 700, as described for FIGS. 6 and 7, are similar, the use of both analytics methods together, as described for method 800, may increase the accuracy of a predictive model, where the dual-use prediction model correctly identifies and classifies a social media posting for a life event on a degree of 5 percentage points, or more, than the image-based or text-based predictive models alone.

The method of FIG. 8 may include any of the functionality or techniques as described for the methods 300, 600, or 700 described for FIGS. 3, 6, and 7 respectively, and, therefore, the related FIGS. 3, 6, and 7 disclosure is incorporated in its entirety herein with respect to FIG. 8. The method 800 may be performed by a computing device with one or more processors, including, for example, the social media analytics system 100 described herein.

With respect to FIG. 8, at 802 and 803, the computing device may collect social media data from one or more social media platforms, such as the social media platforms 130 as described herein. At 802, the text-based data may be collected as described for 602. At 803, the image-based data may be collected as described for 702. Such data can be collected by scraping the social media web pages or retrieving the data via an API, each as described herein.

At 804 and 805, event related data may be extracted from text-based data and image-based data, as described for 604 and 704 for FIGS. 6 and 7, respectively. Blocks 804 and 805 may include targeting specific portions of a social media posting where event related data typically appears, such as within the body of the social media posting or other areas, as described herein.

At 804, for example, the method may extract the text-based event related data from posting 500, including any of the text data in items 502, 504, 508, 510, 522, and related text-based event related data from social media comments 550, including any of the text data in items 552 to 576. Event related data would be extracted and identified as described with respect to 604 as descried herein.

At 805, for example, the method may extract image-based event related data from posting 500, including the human facial image data, such as the eyes, nose, mouth of the baby and the man, as describe for FIG. 8.

At 806, the computing device performs analytics on the extracted text-based and image-based social media data to classify the social media posting into one or more life events.

In one aspect, the classification may include use of any of the one or more text-based and image-based analytical techniques, for example, those described for methods 600 and 700 of FIGS. 6 and 7, respectively, and then determining the average, mean, median, mode, or otherwise combined statistical weighting or score of each of the techniques. Based on the combined weighting or score the given social media posting could then be classified into one or more life event categories.

In another aspect, the analysis may include applying a predictive model determined from a machine learning process to the extracted event data. For example, such a predictive model may be built by training a machine learning program with extracted text data and the extracted image data. As described for FIG. 9 herein, in a neural network predictive model, each of the nodes or layers of the neural net may take as input text or image data and send as output a weight value to further nodes or layers associated with analyzing additional image or text data. In this manner, both the image and text event based data are associated and utilized within the neural network of the machine learning model to determine one or more life event classifications.

For example, the neural net predictive model may take as input extracted event data from posting 500, where, for example, the extracted event data includes at least both the image data from image 524 and text data 508 and 510. The image data may be input into nodes of a first layer of the predictive model, where the model assigns weights to the human facial features (the eyes, noses, and mouth) as described for FIG. 7. Then, the weights from the image related nodes and layer are passed to the next layer that may include further nodes for additional image data, or nodes for text-data, or a combination of both. The nodes for the text-based data would take as input the text-based event related data as described for FIG. 6, for example, the key words or phrases "baby" and "boy" and the hashtag "#NewDad." Just as for the image-based nodes and layers, the text-based nodes and layers may be at the first layer or subsequent layers and could receive as input and/or send as output, weights computed at or for each of the nodes and layers in the neural net. The final nodes and layers of the neural net may then output a final weighting, or weightings, that could then be used to classify the posting into one or more life event categories.

In the above example, the neural net predictive model 500 may assign a high probability for the childbirth event based upon both the image data and the text data, considered together in the neural net, from the post 500. As described, the accuracy of the prediction model in classifying life events, using both the image data and the text data together, is typically improved over prediction models using text-based data only, or image-based data only.

At 808, and based upon the classification and/or analytics of 806, the computing device may trigger an activity, including the communication of messages and postings to social media users, such as, for example, marketing messages, advertisements, public and consumer relationship messages and articles and the like as described herein, for example, as described herein for FIG. 6 or 7.

Other aspects may be used or applied to the systems and methods describe herein. For example, the analytic techniques and/or predictive models described herein may be further improved by building a unique user profile for each social media user, where data from past postings or other user data sources, including user post history, self-descriptions, and friend networks from multiple platforms, are used as further input to the analysis or predictive model to enhance the accuracy of the detection of life events.

For example, image and text data from a user's past postings may be analyzed together with image and text data from a current posting of the same user, using the analytical techniques described herein, to determine a trending pattern. In one aspect, the past posting data of a user who posted posting 500 could be analyzed together with the posting 500 to determine whether a childbirth life event is trending. In another aspect, a self-description, for example, "new father," of the user could be included as part of the data and used to further determine the likelihood of a childbirth event. In another aspect, friend network data, for example, data that indicates that the user is part of friend network or group, e.g., titled or associated with the "new parents" group, could be further indicative of a classification of the childbirth life event.

FIG. 9 shows an example neural network predictive model 900 in accordance with embodiments described herein. The neural network 900 may be trained or created with a machine learning process that takes as input data 950 used for the prediction. The model 900 may input various types of data, including image-based data 952 and/or text-based data 954. The data may be raw data or extracted data, for example, extracted event related data as disclosed herein. Although FIG. 9 shows three data inputs, fewer or more inputs may be used based on the number and type of data used in for the prediction, identification, or otherwise classification in accordance with the disclosure herein.

The machine learning process may use the input data to determine a number of layers, for example layers 902-906, and nodes, for example, nodes 910-914, 920-926, and 930-940. In another aspect, the machine learning process may involve a user specifying an initial number of layers and/or nodes. Layer 1 902 is the first layer of the neural net, that is the input layer, that receives the data, for example data 950, 952, and/or 954. Layer 2 904 is a "hidden" layer, or a layer that is between an input layer and an output layer. There may be zero to many hidden layers in a neural network model. Hidden layers receive data from either the input layer or other hidden layers. Layer 3 906 represents the final layer, that is the output layer, in the neural net. The output layer receives data either directly from the input layer (in a two layer model) or from a hidden layer. The output layer outputs the final value or values, for example, classification probability values 960 and 962, from the predictive model.

Layers contain nodes. The nodes receive the input data, apply a weighted data value to the input data, and output the weighted result value to the next node, or, if the node is part of the final output layer, then as the final value from the predictive model. The weighted data value of the nodes are determined by the machine learning training process, for example, which can be any of random values, user specified values, such as approximations or assumptions of best possible starting value, or values from a machine learning algorithm that determines values from the data input, or a combination thereof. In one aspect, the weighted data values may be determined by reducing the error rate of each respective weighted value, the error being the difference between an actual value for the node, layer or model, and the related weighted value thereof, and/or using weights that otherwise increase the overall accuracy of the prediction. In this way, the weighted values become part of the neural network's decision making process.

For example, data 950 may be input into Layer 1 902 and received at node N1a 910. The weighted value of node N1a 901 is then applied to the data 950, for example by a multiplication, addition, or otherwise analytical computation of the weighted node value with an initial probability value assigned to the data 950. The output result 970 of node N1a 910 is then sent to the nodes of Layer 2, including, for example, node N2a 920 and multiplied with the weighted value of node N2a 920. The output result 972 of node N2a 920 is then sent to the nodes of Layer 3, including node Nza 930 and multiplied with the weighted value of node Nza. The output result of node Nza 930 is then output from the model as the final weighted value.

As another example, image-based data 952 (e.g., pixels indicating two sets of human faces, one small and one large) and text-based data 954 (e.g., the phrase "baby boy") are input into the neural network predictive model 900 at Layer 1 902. A high probability value for identification of a childbirth life event are initially assigned to each of image-based data 952 and text-based data 954. The weighted value of node N1b 912 is applied to image-based data 952 at node N1b 912 and the result is output to the nodes of Layer 2, including, for example, node N2c. 924. The weighted value of node N1c 914 is applied to the text-based data 954 at node N1c 914 and the result is also output to Layer 2, including, for example, node N2c 924. At node N2c 924, output results regarding both the image data 952 and the text data 954, from nodes N1b 912 and N1c 914, respectively, are applied together with the weighted value of node N2c 924 and the output result is sent to Layer Z, including, for example, node Nza 930. At node Nza 930, the output result from node N2c 924 is applied with the weighted value of node Nza 930 and the final weighted value is output from the predictive model. The final weighted value may be used, for example, to determine a classification for a given social media posting. The determination could be made based on the text 952, image 954 or other data 950 related to the posting. In one aspect, the final weighted value is a probability value 960 that the posting, given the input data 950, 952 and 954 is associated with a given life event, e.g., childbirth event, and the determination of whether to classify the event as "childbirth" depends on whether the output probability value 960 is above a certain threshold value, e.g., above 90% probability threshold determines that the posting is associated with a childbirth event.

Although FIG. 9 shows three layers with three nodes, four nodes, and two nodes in each of Layers 1, 2, and Z, respectively, any number or combination of layers and nodes may be used for a neural net predictive model in accordance with the disclosures herein.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner.

In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A social media analytics system configured to improve the accuracy of the identification and classification of a social media posting, the social media analytics system comprising:

a social media analytics server communicatively coupled, via a computer network, to one or more social media data sources, wherein the social media analytics server is configured to execute one or more instructions to:

collect image-based data from the one or more social media data sources associated with a social media posting, collect text-based data from the one or more social media data sources associated with the social media posting, collect reaction data from one or more social media data sources associated with the social media posting, and extract a first set of event related data from each of the image-based data, the text-based data, and the reaction data of the social media posting, wherein each of the image-based data, the text-based data, and reaction data together is indicative of a given life event associated with a social media user who posted the social media posting; and a machine-learning based predictive model executing on the social media analytics server, wherein the machine-learning based predictive model is trained on a second set of event related data comprising each of (1) image-based data, (2) text-based data, and (3) reaction data, the second set of event related data representative of life events of social media postings, and the machine-learning based predictive model configured to:

input each of the (1) image-based data, (2) the text-based data, and (3) the reaction data of the first set of event related data, determine one or more life event classifications based upon the first set of event related data, wherein the determination includes the machine-learning based predictive model analyzing at least a portion of the image-based data comprising one or more extracted human body portions having distinct human feature distance values indicative of the given life event, and trigger an activity based upon the one or more life event classifications, wherein the triggered activity includes sending a communication regarding the one or more life events to a social media user device of the social media user, wherein the communication is displayed on the social media user device.

2. The social media analytics system of claim 1, wherein the one or more life events includes one of more of the following: getting married, buying a new car, buying a new house, childbirth, graduation, or winning a gaming event.

3. The social media analytics system of claim 1, wherein the text-based data includes one or more of the following: message data, hashtag data, name data, signature data, comment data, emoticon data, reaction data, statistical data, or metadata.

4. The social media analytics system of claim 1, wherein the collection of text-based data from one or more social media data sources further includes collection of text-based data from a user profile associated with the social media user.

5. The social media analytics system of claim 1, wherein the machine-learning based predictive model is a neural network predictive model.

6. A social media analytics method for improving the accuracy of the identification and classification of a social media posting, using one or more processors, the method comprising:
   collecting, by a social media analytics server from one or more social media data sources, image-based data from one or more social media data sources associated with a social media posting;
   collecting, by the social media analytics server from the one or more social media data sources, text-based data from one or more social media data sources associated with the social media posting;
   collecting, by the social media analytics server from the one or more social media data sources, reaction data from one or more social media data sources associated with the social media posting;
   extracting a first set of event related data from each of the image-based data, the text-based data, and the reaction data of the social media posting, wherein each of the image-based data, the text-based data, and the reaction data together is indicative of a given life event associated with a social media user who posted the social media posting;
   training a machine-learning based predictive model on a second set of event related data comprising each of (1) image-based data, (2) text-based data, and the (3) reaction data, the second set of event related data representative of life events of social media postings;
   inputting each of the (1) image-based data, (2) the text-based data, and the (3) reaction data of the first set of event related data;
   determining one or more life event classifications based upon the first set of event related data, wherein the determining includes the machine-learning based predictive model analyzing at least a portion of the image-based data comprising one or more extracted human body portions having distinct human feature distance values indicative of the given life event; and
   triggering an activity based upon the one or more life event classifications, wherein the triggered activity includes sending a communication regarding the one or more life events to a social media user device of the social media user, wherein the communication is displayed on the social media user device.

7. The social media analytics method of claim 6, wherein the one or more life events includes one of more of the following: getting married, buying a new car, buying a new house, childbirth, graduation, or winning a gaming event.

8. The social media analytics method of claim 6, wherein the text-based data includes one or more of the following: message data, hashtag data, name data, signature data, comment data, emoticon data, reaction data, statistical data, or metadata.

9. The social media analytics method of claim 6, wherein the collection of text-based data from one or more social media data sources further includes collection of text-based data from a user profile associated with the social media user.

10. The social media analytics method of claim 6, wherein the machine-learning based predictive model is a neural network predictive model.

11. A tangible, non-transitory computer-readable medium storing instructions for improving the accuracy of the identification and classification of a social media posting, that, when executed by one or more processors of a computer system, cause the computer system to:
   collect, by a social media analytics server from one or more social media data sources, image-based data from one or more social media data sources associated with a social media posting;
   collect, by the social media analytics server from the one or more social media data sources, text-based data from one or more social media data sources associated with the social media posting;
   collect, by the social media analytics server from the one or more social media data sources, reaction data from one or more social media data sources associated with the social media posting;
   extract a first set of event related data from each of the image-based data, the text-based data, and the reaction data of the social media posting, wherein each of the image-based data, the text-based data, and the reaction data together is indicative of a given life event associated with a social media user who posted the social media posting;
   train a machine-learning based predictive model on a second set of event related data comprising each of (1) image-based data, (2) text-based data, and (3) reaction data, the second set of event related data representative of life events of social media postings;
   input each of the (1) image-based data, (2) the text-based data, and the (3) reaction data of the first set of event related data;
   determine one or more life event classifications based upon the first set of event related data, wherein the determination includes the machine-learning based predictive model analyzing at least a portion of the image-based data comprising one or more extracted human body portions having distinct human feature distance values indicative of the given life event; and
   trigger an activity based upon the one or more life event classifications, wherein the triggered activity includes sending a communication regarding the one or more life events to a social media user device of the social media user, wherein the communication is displayed on the social media user device.

12. The tangible, non-transitory computer-readable medium of claim 11, wherein the one or more life events includes one of more of the following: getting married, buying a new car, buying a new house, childbirth, graduation, or winning a gaming event.

13. The tangible, non-transitory computer-readable medium of claim 11, wherein the text-based data includes one or more of the following: message data, hashtag data, name data, signature data, comment data, emoticon data, reaction data, statistical data, or metadata.

14. The tangible, non-transitory computer-readable medium of claim 11, wherein the collection of text-based data from one or more social media data sources further includes collection of text-based data from a user profile associated with the social media user.

15. The tangible, non-transitory computer-readable medium of claim 11, wherein the machine-learning based predictive model is a neural network predictive model.

* * * * *